United States Patent
Kornprobst

(10) Patent No.: US 7,359,705 B2
(45) Date of Patent: Apr. 15, 2008

(54) RANDOM ACCESS BURST TRANSMISSION SCHEME

(75) Inventor: Stefan Kornprobst, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 0 days.

(21) Appl. No.: 09/521,394

(22) Filed: Mar. 8, 2000

(65) Prior Publication Data
US 2003/0114113 A1    Jun. 19, 2003

(30) Foreign Application Priority Data
Mar. 10, 1999    (EP) .................................. 99104766

(51) Int. Cl.
*H04Q 7/20*    (2006.01)
*H04B 12/413*    (2006.01)
(52) U.S. Cl. ...................... 455/435.3; 455/69; 370/448
(58) Field of Classification Search ................ 455/435, 455/436, 432, 69, 70, 453, 458, 510, 435.3, 455/166.2, 68; 370/447, 448
See application file for complete search history.

(56) References Cited

U.S. PATENT DOCUMENTS

| | | | | |
|---|---|---|---|---|
| 4,409,592 A | * | 10/1983 | Hunt | 340/825.5 |
| 5,274,837 A | * | 12/1993 | Childress et al. | 455/510 |
| 5,303,234 A | * | 4/1994 | Kou | 370/459 |
| 5,355,516 A | * | 10/1994 | Herold et al. | 455/34.1 |
| 5,502,721 A | * | 3/1996 | Pohjakallio | 455/466 |
| 5,533,025 A | * | 7/1996 | Fleek et al. | 370/85.2 |
| 5,577,024 A | * | 11/1996 | Malkamaki et al. | 370/337 |
| 5,752,193 A | * | 5/1998 | Scholefield et al. | 455/452 |
| 5,966,375 A | * | 10/1999 | Kagaya | 370/338 |

FOREIGN PATENT DOCUMENTS

EP    0 339 740    11/1989

* cited by examiner

*Primary Examiner*—Naghmeh Mehrpour
(74) *Attorney, Agent, or Firm*—Oblon, Spivak, McClelland, Maier & Neustadt, P.C.

(57) ABSTRACT

The present invention relates to an apparatus for transmitting and receiving signals in a wireless telecommunication system and to a method for transmitting random access bursts in such an apparatus. The apparatus 1 comprises transmitting means 3 for transmitting random access bursts, receiving means 4 for receiving acknowledgement information confirming a successful transmission of a random access burst, decision means for deciding if acknowledgement information has been received, and control means 6 for randomly choosing a time point for an attempt to retransmit said random access burst from an interval if no acknowledgement information has been received after a random access burst had been transmitted, whereby the control means sets the length of the interval depending on the number of unsuccessful attempts to transmit a random access burst. The proposed backoff scheme provides an improved performance and increased system stability without the need for a collision detection on the network side. Further, the proposed backoff scheme supports different priority classes for the transmission of random access bursts.

25 Claims, 2 Drawing Sheets

RANDOM ACCESS BURST TRANSMISSION SCHEME

Figure 1:
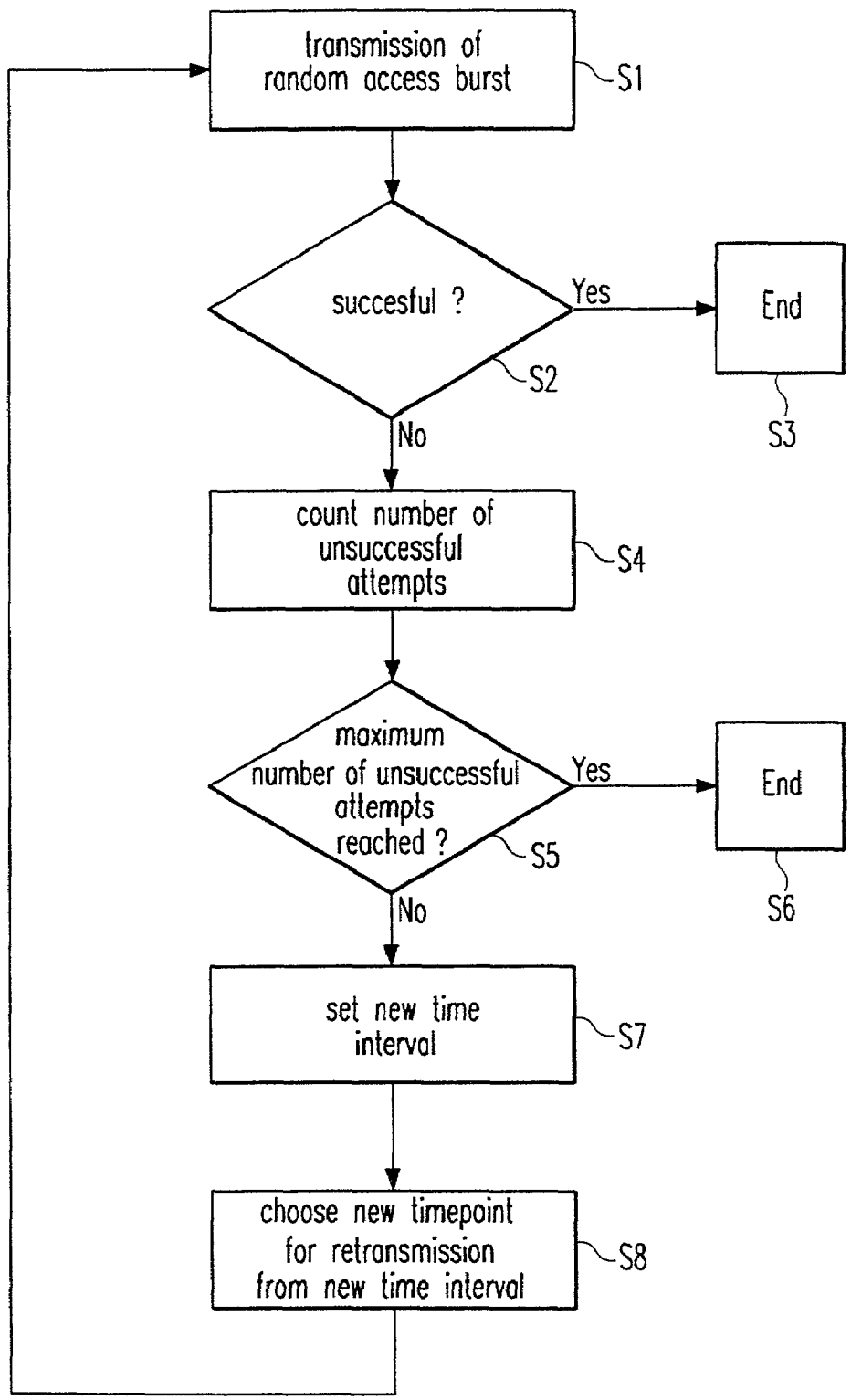

The present invention relates to an apparatus for transmitting and receiving signals in a wireless telecommunication system and a method for transmitting random access bursts in such an apparatus. Particularly, the present invention relates to a backoff scheme for the transmission of random access bursts in a mobile station of a wireless telecommunication system.

In wireless telecommunication systems, as for example the GSM system, the mobile station uses the random access channel (RACH) to send random access bursts to acquire services from the network. If for example a mobile station of a mobile cellular system needs a data channel to transmit user data, it sends a random access burst over the random access channel to the selected base station. The base station receiving a random access burst sends an acknowledgement or a confirmation message to the mobile station to indicate, that the transmission of the random access burst from the mobile station to the base station has been successful. The confirmation information might be the access grant information sent by a base station to indicate that the requested service is granted. After a successfully transmitted random access burst, the base station allocates the respective requested service, for example a user data channel, to the mobile station.

The transmission of a random access burst from a mobile station to a base station is contention based and collisions can occur. If for example several mobile stations within one cell of the telecommunication system simultaneously send random access bursts, collisions can occur and the random access bursts can not be correctly received and confirmed by the base station. Having sent a random access burst to a base station, the mobile station checks if an acknowledgement information from the base station has been received. If an acknowledgement information has not been received after a predetermined time period, the mobile station decides that the transmission attempt of the random access burst has not been successful. After such a failed random access burst transmission attempt, a backoff mechanism determines, when a new transmission of the random access burst shall take place. The same is true after a retransmission of a random access burst and not only for the first transmission attempt.

Different kinds of backoff mechanisms are known in the prior art. For example, in a so-called bayesian backoff scheme, the network side, i.e. the base station, estimates, if the random access channel has been occupied or not, if collisions occurred or if a random access burst has been successfully transmitted. Estimation information about the result of this estimation is sent to the mobile stations, so that the mobile stations can set their backoff mechanisms depending on the estimation information. Another known possibility is a detection of the collisions of competing random access bursts at the user equipment side. The known systems require much downlink resources, since the base station has to regularly transmit estimation information to the mobile stations or are very complex because collision detection is needed.

The U.S. Pat. No. 5,544,196 discloses an apparatus and a method for reducing message collision between mobile stations simultaneously accessing the base station in a wireless telecommunication system. Hereby, a mobile station inserts a random delay between successive random access burst transmissions if it does not receive an acknowledgement after a predetermined time period. The random delay is set by randomly choosing a time point from a predetermined time interval. Thus, the time interval, from which a new time point for a retransmission of a random access burst is choosen, is fixedly preset. This relatively simple backoff mechanism is also used in the GSM system. Particularly in cases, in which the random access channel is very occupied and a lot of collisions occur, this known system is very ineffective, since a lot of random access burst transmission attempts are performed with a very low probability of a successful transmission.

The object of the present invention is therefore to provide an apparatus for transmitting and receiving signals in a wireless telecommunication system and a method for transmitting random access bursts in an apparatus for transmitting and receiving signals in a wireless telecommunication system, which provide a more effective backoff scheme for the transmission of the random access bursts.

This object is achieved by an apparatus for transmitting and receiving signals in a wireless telecommunication system according to claim 1, with transmitting means for transmitting random access bursts, receiving means for receiving acknowledgement information confirming a successful transmission of a random access burst, decision means for deciding if acknowledgement information has been received, and control means for randomly choosing a time point for an attempt to retransmit said random access burst from an interval if no acknowledgement information has been received after a random access burst had been transmitted, characterized in that said control means sets the length of said interval depending on the number of unsuccessful attempts to transmit a random access burst.

The above object is further achieved by a method for transmitting random access bursts in an apparatus for transmitting and receiving signals in a wireless telecommunication system according to claim 9, comprising the steps of transmitting a random access burst, deciding, if an acknowledgement information confirming a successful transmission of said random access burst has been received, and randomly choosing a time point for an attempt to retransmit said random access burst from an interval if no acknowledgement information has been received, characterised by setting the length of said interval depending on the number of unsuccessful attempts to transmit a random access burst.

The present invention thus provides a backoff scheme for retransmission of random access burst, which is very effective, flexible and does not require a high complexity. Particularly, the present invention does not require a system to detect or estimate collisions of random access bursts at the network side but enables at the same time a flexible adaptation of the backoff scheme to the current random access channel situation. By setting the length of the interval, from which the time point for the retransmission is randomly choosen, depending on the number of previous unsuccessful attempts, the number of unsuccessful attempts until a successful transmission of a random access burst can be reduced. Thereby, the performance is enhanced and the system stability is improved. At the same time a high and effective throughput of random access bursts on a random access channel can be achieved. Although the present invention can advantageously be applied in mobile stations of a wireless telecommunication system, it might also be advantageous for terminals of other systems.

Advantageously, the interval length is set longer when the number of unsuccessful attempts increases. Hereby, in situations of heavy traffic on the random access channel and a large number of collisions, the timepoint for a retransmission is postponed and the probability for a successful retransmission is significantly increased. Hereby, the interval length is advantageously depending exponentially on the number of unsuccessful attempts.

Advantageously, the control means randomly chooses the timepoint for a retransmission attempt after a predetermined offset time has elapsed. After transmission or retransmission of a random access burst it is determined only after said predetermined offset time has passed if an acknowledgement information, e. g. from a selected base station, has been received.

Further, the control means can only choose a timepoint for a retransmission attempt if it is determined that the number of unsuccessful attempts is lower than a predetermined maximum number of unsuccessful attempts. By setting a maximum number of attempts it can be avoided that an infinite number of attempts is performed. Since according to the present invention the length of the interval depends on the number of unsuccessful attempts, the probability is reduced, that the maximum number of retransmissions is reached.

The concept of the present invention is further advantageous in that it allows to allocate different priorities for the service requests transmitted with the random access bursts. Hereby, the interval length can be set depending on different priority classes of the random access bursts. Advantageously, the interval length is thereby set shorter for higher priority classes. This allows to provide a very small mean time until a successful transmission of a random access burst for high priority service requests, whereby random access bursts of lower priority classes consequently have a higher mean time until a successful transmission.

Further advantageously, the interval is represented by a series of numbers representing time slots in the wireless telecommunication system.

Figure 2:
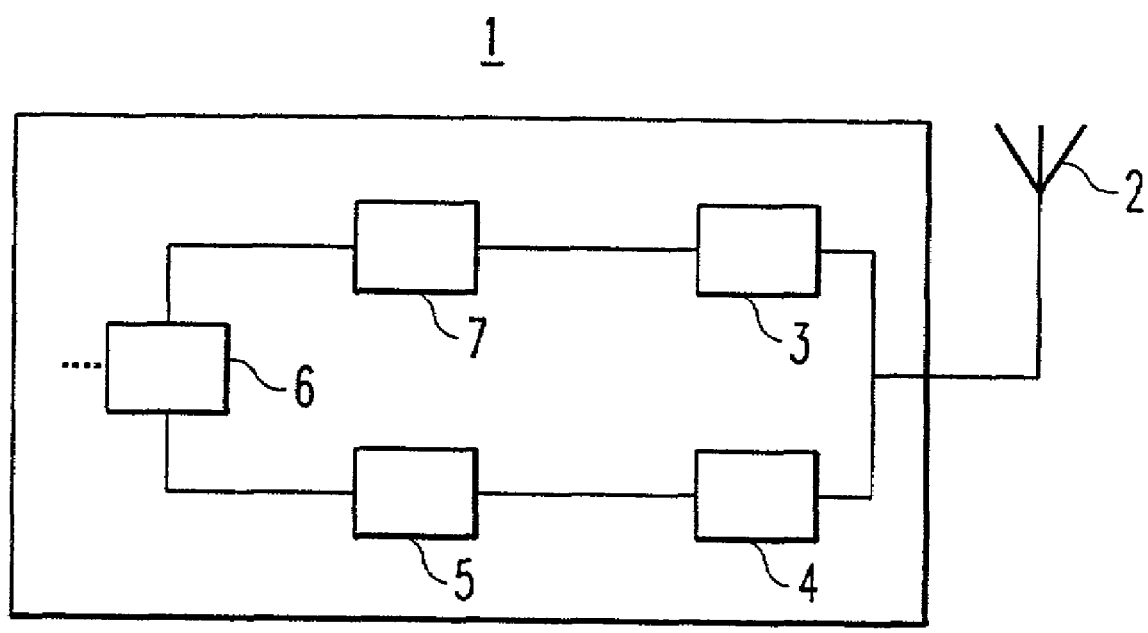

In the following description, the present invention is explained in more detail on the basis of a preferred embodiment relating to the enclosed drawings, in which FIG. 1 shows a flow chart for explaining the back-off method of the present invention, and FIG. 2 shows a bloc diagram of a terminal of a wireless telecommunication system incorporating a back-off mechanism structure according to the present invention.

FIG. 1 shows a flow chart of a method for transmitting random access bursts in a terminal of a wireless telecommunication system according to the present invention. In step S1, a first transmission of a random access burst generated in the terminal is sent. If, e. g., a mobile station of the wireless telecommunication system needs a channel to transmit user data, a service request in form of a random access burst is transmitted to the selected base station. In case that the base station successfully receives the random access burst, it generates and transmits an acknowledgement information back to the mobile station. The acknowledgement information can e. g. be an access grant information or the like. In case that the mobile station successfully receives the acknowledgement information, it decides in a step S2, that the first transmission of the random access burst has been successful. Consequently, no retransmission attempts are necessary and the procedure is terminated in a step S3. A base station can transmit together with or integrated in the acknowledgement information further information on the allocation of the requested service, e. g. on the channel to be used for the transmission of user data.

After the transmission of a first random access burst in step S1, the apparatus, e. g. the mobile station, decides, if an acknowledgement information had been received or not. In case that an acknowledgement information has not been received after a predetermined offset time period has elapsed, the decision is negative and an unsuccessful transmission is assumed. In case an acknowledgement information is received within said predetermined offset time period, the decision is positive and a successful transmission is assumed.

In case that the decision in step S2 is negative, the procedure goes to step S4, in which the number of unsuccessful attempts is accumulated. In the next step S5 it is determined, if the number of unsuccessful attempts has reached a predetermined maximum number of attempts. If this is the case, the procedure is terminated in step S6. In case that the accumulated number of unsuccessful attempts has not yet received the predetermined maximum number of attempts, the procedure goes to step S7. In step S7, a new time interval is set, from which a new time point for the next transmission of the random access burst is choosen in step S8. Hereby, the new time interval set in step S7 is calculated on the basis of the accumulated number of unsuccessful previous attempts. The time interval is thereby set by calculating a number of time slots depending on the accumulated number of unsuccessful attempts. The time interval is thus represented by a series of numbers $\{1, 2, \ldots, MW+S \times B^{PO+NF}\}$, whereby each number represents a number of time slots as the basic unit. The time slots are thereby the basic time slots of the respective wireless telecommunication system. The factor MW is the minimum length of the time interval, the factor S is a scaling factor, the factor B is a base factor, the factor PO is a power offset factor and the factor NF is the number of failures. The number of failures is hereby the accumulated number of unsuccessful attempts calculated in step S4. All factors are non-negative integers, whereby the factor NF varies from attempt to attempt. The other factors can either be preset or varied more slowly on the basis of other system parameters.

In step S8, a new time point for the next transmission or the retransmission of the random access burst is randomly choosen from the time interval set in step S7. Hereby, the new time point is randomly drawn on the basis of the uniform probability distribution. As can be seen from the above formula, the time between transmissions is increased with an increasing number of unsuccessful attempts or failures. Particularly due to the exponential dependency, the time interval from which the new time point is randomly choosen is strongly extended so that the probability of future unsuccessful attempts, e. g. due to collisions, is significantly reduced. Thus, the overall system stability is strongly enhanced.

The factor MW which determines the minimum width of the time interval can e. g. be set to ten time slots, so that a certain minimum time interval is assured. The factors S, B and PO can be used to support different priority classes for the random access bursts. Thereby, these factors are preset so that the time interval is shorter for higher priority classes. If, e. g. four different priority classes for four different classes of service requirements and consequently random access bursts are assumed, the factors can have different values for the different priority classes. Hereby, it is sufficient to vary e. g. only the scaling factor S for the different priority classes. For the highest priority class, the factors could be set as follows: $S=1$, $B=2$, $PO=0$. For the second priority class, the following values could be used: $S=4$, $B=2$, $PO=0$. For the third priority class, the factors could be set as follows: $S=8$, $B=2$, $PO=0$. For the fourth and lowest priority class, the factors could be set as follows: $S=12$, $B=2$ and PO=0. Simulations have shown, that it is sufficient and thus recommendable to vary only the factor S so that the calculation scheme is simplified.

After step S8, a retransmission of the random access burst is performed at the randomly choosen time point. Thereby, the time interval set in step S7 determines the number of time slots starting from the end of the predetermined offset time, after which it is determined in step S2, if an acknowledgement information had been received or not. The absolute time point for a retransmission of a random access burst is thus given by the predetermined offset time plus the time point choosen in step S8. As can be seen from the above example, only the scaling factor S is advantageously varied for different priority classes. The base parameter B and the power offset parameter PO remain unchanged, whereby these parameters can also be changed to adapt the backup mechanism to slowly varying system conditions.

In FIG. 2, a bloc diagram of an apparatus for transmitting and receiving signals in a wireless telecommunication system according to the present invention is shown. The shown apparatus 1 can e. g. be a mobile station of a cellular mobile system and is adapted to perform the steps shown in and explained in relation to FIG. 1. Thereby, the bloc diagram of FIG. 2 only shows the elements which are important in relation to the present invention. Other elements which are necessary to operate the shown apparatus 1 in a corresponding telecommunication system, like modulators, demodulators, interleavers, microphone, loudspeaker and so forth are not shown for the sake of clarity.

The apparatus 1 comprises an antenna 2 for receiving and transmitting signals in the wireless telecommunication system. The antenna 2 is connected to a transmitting means 3 and a receiving means 4. The transmitting means 3 serves for transmitting signals and can e. g. comprise a corresponding high frequency portion. The receiving means 4 serves for receiving signals and comprises a corresponding high frequency portion for downconverting the received high frequency signals to the base band. The receiving means 4 is connected to a decision means 5. The transmitting means 3 is connected to a random access channel generation means 7, in which random access bursts are generated. Both the random access generation means 7 and the decision means 5 are connected to a control means in form of a central processing unit 6.

In case that a service request or the like has to be made from the apparatus 1 to another apparatus of the telecommunication system, the central processing unit 6 gives a corresponding signal to the random access generation means 7 to generate the necessary random access burst. The random access burst is then transmitted by the transmitting means 3. The decision means 5 checks if a corresponding acknowledgement information has been received within a predetermined offset time period by the receiving means 4. The central processing unit 6 therefore informs the decision means 5 on the time point of a transmission of a random access burst by the transmitting means 3 so that the decision means 5 is able to compare the actual time given by a timing generator with the predetermined offset time period starting from the time point of the transmission of a random access burst. In case that an acknowledgement information is received by the receiving means 4 within the predetermined offset time period, no retransmission of a random access burst is necessary. In case that no acknowledgement information has been received after the predetermined offset time has elapsed, the control means 6 randomly chooses a time point for an attempt to retransmit a random access burst from a time interval. The time interval is thereby set by the control means 6 depending on the number of previous unsuccessful attempts to transmit the random access burst. The control means 6 thereby sets the time point for the next attempt like described in relation to steps S7 and S8 of FIG. 1.

Therefore, the present invention provides a backoff scheme for transmitting random access bursts in a telecommunication apparatus with a very good performance and with a very high stability as compared to known systems. Particularly, the throughput is still considerably high even for high loads, e. g. in regions of congestion. Further, no backoff specific resources on the downlink channel are required and the detection of collisions on the network side is not necessary.

The invention claimed is:

1. A method for transmitting random access bursts in an apparatus for transmitting and receiving signals in a wireless telecommunication system, comprising transmitting a first random access burst with a first priority class, transmitting a second random access burst with a second priority class, said second priority class lower than said first priority class, deciding if first acknowledgement information confirming a successful transmission of said first random access burst has been received, deciding if second acknowledgement information confirming a successful transmission of said second random access burst has been received, randomly choosing a first time point for an attempt to retransmit said first random access burst from within a first interval if no first acknowledgement information has been received, randomly choosing a second time point for an attempt to retransmit said second random access burst from within a second interval if no second acknowledgement information has been received, setting the length of said first interval depending on at least two parameters, whereby a first parameter indicates the number of unsuccessful attempts to transmit the first random access burst and a second parameter indicates the first priority class, and setting the length of said second interval depending on at least two parameters, whereby a third parameter indicates the number of unsuccessful attempts to transmit the second random access burst and a fourth parameter indicates the second priority class, whereby said second and fourth parameters are chosen so that said first interval is set shorter than said second interval.

2. The method for transmitting random access bursts in an apparatus for transmitting and receiving signals in a wireless telecommunication system according to claim 1, wherein said first interval length is set longer when the first parameter increases.

3. The method for transmitting random access bursts in an apparatus for transmitting and receiving signals in a wireless telecommunication system according to claim 2, wherein said first interval length depends exponentially on the first parameter.

4. The method for transmitting random access bursts in an apparatus for transmitting and receiving signals in a wireless telecommunication system according to claim 1, wherein said first time point for a retransmission attempt is randomly chosen after a predetermined offset time has elapsed.

5. The method for transmitting random access bursts in an apparatus for transmitting and receiving signals in a wireless telecommunication system according to claim 1, wherein said first time point for a retransmission attempt is only chosen if it is determined that the first number of unsuccessful attempts is lower than a predetermined maximum number of unsuccessful attempts.

6. A method for transmitting random access bursts in an apparatus for transmitting and receiving signals in a wireless telecommunication system, comprising:
   transmitting a first random access burst with a first priority class,
   transmitting a second random access burst with a second priority class, said second priority class lower than said first priority class,
   deciding if first acknowledgement information confirming a successful transmission of said first random access burst has been received,
   deciding if second acknowledgement information confirming a successful transmission of said second random access burst has been received,
   randomly choosing a first time point for an attempt to retransmit said first random access burst from within a first interval if no first acknowledgement information has been received,
   randomly choosing a second time point for an attempt to retransmit said second random access burst from within a second interval if no second acknowledgement information has been received,
   setting the length of said first interval depending on the number of unsuccessful attempts to transmit the first random access burst and on the first priority class, and
   setting the length of said second interval depending on the number of unsuccessful attempts to transmit the second random access burst and on the second priority class,
   wherein said first interval is shorter than said second interval.

7. A method for transmitting random access bursts in an apparatus for transmitting and receiving signals in a wireless telecommunication system, comprising:
   transmitting a random access burst with a first priority class,
   transmitting a second random access burst with a second priority class, said second priority class lower than said first priority class,
   deciding if first acknowledgement information confirming a successful transmission of said first random access burst has been received,
   deciding if second acknowledgement information confirming a successful transmission of said second random access burst has been received,
   randomly choosing a first time point for an attempt to retransmit said first random access burst from within a first interval if no first acknowledgement information has been received,
   randomly choosing a second time point for an attempt to retransmit said second random access burst from within a second interval if no second acknowledgement information has been received,
   setting the length of said first interval depending on the number of unsuccessful attempts to transmit the first random access burst and on the first priority class, and
   setting the length of said second interval depending on the number of unsuccessful attempts to transmit the second random access burst and on the second priority class,
   wherein the first priority class is varied on the basis of system parameters and said first interval is set shorter than said second interval.

8. A method for transmitting random access bursts in an apparatus for transmitting and receiving signals in a wireless telecommunication system, comprising:
   attempting to transmit a first random access burst with a first priority class,
   attempting to transmit a second random access burst with a second priority class, said second priority class lower than said first priority class,
   deciding if first acknowledgement information confirming a successful transmission of said first random access burst has been received,
   deciding if second acknowledgement information confirming a successful transmission of said second random access burst has been received,
   setting the length of a first interval for transmitting said first random access burst based on the first priority class and varying said length of the first interval which is set for the first priority class in accordance with a number of unsuccessful attempts to transmit the first random access burst,
   setting the length of a second interval for transmitting said second random access burst based on the second priority class and varying said length of the second interval which is set for the second priority class in accordance with a number of unsuccessful attempts to transmit the second random access burst,
   randomly choosing a first time point for an attempt to retransmit the first random access burst from said length of the first interval, and
   randomly choosing a second time point for an attempt to retransmit the second random access burst from said length of the second interval,
   wherein the first interval is shorter than the second interval.

9. A method for transmitting random access bursts in an apparatus for transmitting and receiving signals in a wireless telecommunication system, comprising:
   attempting to transmit a first random access burst with a first priority class to the base station at a first time point which was randomly chosen from a first time interval,
   attempting to transmit a second random access burst with a second priority class to the base station at a second time point which was randomly chosen from a second time interval,
   varying the length of said first time interval in accordance with both the first priority class and a first number of unsuccessful attempts,
   varying the length of said second time interval in accordance with both factors the second priority class and a second number of unsuccessful attempts,
   randomly choosing a third time point for an attempt to retransmit a next first random access burst from said first varied length of interval, and
   randomly choosing a fourth time point for an attempt to retransmit a next second random access burst from said second varied length of interval.

10. A method for transmitting random access bursts in an apparatus for transmitting and receiving signals in a wireless telecommunication system, comprising:
    attempting to transmit a first random access burst with a first priority class by randomly choosing a time point from a first predetermined time interval,
    attempting to transmit a second random access burst with a second priority class by randomly choosing a time point from a second predetermined time interval,
    deciding if said first random access burst is successfully transmitted, deciding if said second random access burst is successfully transmitted, controlling a length of said first interval by using an equation for deciding the length of the first interval, wherein said equation for deciding the length of the first interval includes a first parameter indicating the first priority class and a second parameter which is varied on the basis of a first number of unsuccessful attempts, controlling a length of said second interval by using an equation for deciding the length of the second interval, wherein said equation for deciding the length of the second interval includes a third parameter indicating the second priority class and a fourth parameter which is varied on the basis of a second number of unsuccessful attempts, randomly choosing a first time point for an attempt to retransmit a next first random access burst from said first varied length of interval, and randomly choosing a second time point for an attempt to retransmit a next second random access burst from said second varied length of interval.

11. A method for transmitting random access bursts in an apparatus for transmitting and receiving signals in a wireless telecommunication system, comprising:

attempting to transmit a first random access burst with a first priority class by randomly choosing a first time point from a first predetermined time interval, attempting to transmit a second random access burst with a second priority class by randomly choosing a second time point from a second predetermined time interval, setting a length of said first interval based on the first priority class, setting a length of said second interval based on the second priority class, varying the length of said first interval corresponding to the first priority class by using an exponential parameter indicating a first number of unsuccessful attempts, varying the length of said second interval corresponding to the second priority class by using an exponential parameter indicating a second number of unsuccessful attempts, randomly choosing a third time point for an attempt to retransmit a next first random access burst from said first varied length of interval, and randomly choosing a fourth time point for an attempt to retransmit a next second random access burst from said second varied length of interval.

12. A method for transmitting random access bursts in an apparatus for transmitting and receiving signals in a wireless telecommunication system, comprising the steps of attempting to transmit a first random access burst with a first priority class by randomly choosing a first time point from a first predetermined time interval, attempting to transmit a second random access burst with a second priority class by randomly choosing a second time point from a second predetermined time interval, setting a length of said first interval based on the first priority class, setting a length of said second interval based on the second priority class, varying the length of said first time interval based on the first priority class and a first number of unsuccessful attempts so that the varied time window is exponentially increased as a function of both parameters concerning said first priority class and said first number of unsuccessful attempts, varying the length of said second time interval based on the second priority class and a second number of unsuccessful attempts so that the varied time window is exponentially increased as a function of both parameters concerning said second priority class and said second number of unsuccessful attempts, randomly choosing a third time point for an attempt to retransmit a next first random access burst from said first varied length of interval, and randomly choosing a fourth time point for an attempt to retransmit a next second random access burst from said second varied length of interval.

13. An apparatus for transmitting and receiving signals in a wireless telecommunication system, comprising:

transmitting means for transmitting a first random access burst with a first priority class and a second random access burst with a second priority class, first decision means for deciding if first acknowledgement information confirming a successful transmission of said first random access burst has been received, second decision means for deciding if second acknowledgement information confirming a successful transmission of said second random access burst has been received, first control means for randomly choosing a first time point from within a first interval for an attempt to retransmit said first random access burst if no first acknowledgement information has been received, said first interval set based on a number of unsuccessful attempts to transmit the first random access burst and the first priority class, and second control means for randomly choosing a second time point from within a second interval for an attempt to retransmit said second random access burst if no second acknowledgement information has been received, said second interval set based on a number of unsuccessful attempts to transmit the second random access burst and the second priority class, wherein said first interval is set shorter than the second interval.

14. The apparatus for transmitting and receiving signals in a wireless telecommunication system according to claim 13, wherein said first interval length is set longer when the number of unsuccessful attempts to transmit the first random access burst increases.

15. The apparatus for transmitting and receiving signals in a wireless telecommunication system according to claim 14, wherein said first interval length depends exponentially on the number of unsuccessful attempts to transmit the first random access burst.

16. The apparatus for transmitting and receiving signals in a wireless telecommunication system according to claim 13, wherein said first control means randomly chooses said first time point for a retransmission attempt after a predetermined offset time has elapsed.

17. The apparatus for transmitting and receiving signals in a wireless telecommunication system according to claim 13, wherein said first control means only chooses a first time point for a retransmission attempt if it is determined that the number of unsuccessful attempts to transmit the first random access burst is lower than a predetermined maximum number of unsuccessful attempts.

18. A aparatus for transmitting and receiving signals in a wireless telecommunication system, comprising:

transmitting means for transmitting a first random access burst with a first priority class and a second random access burst with a second priority class, first decision means for deciding if first acknowledgement information confirming a successful transmission of said first random access burst has been received, second decision means for deciding if second acknowledgement information confirming a successful transmission of said second random access burst has been received, first control means for randomly choosing a first time point for an attempt to retransmit said first random access burst from a first interval if no first acknowledgement information has been received, and second control means for randomly choosing a second time point for an attempt to retransmit said second random access burst from a second interval if no second acknowledgement information has been received, wherein said first control means sets a length of said first interval depending on the number of unsuccessful attempts to transmit the first random access burst and on the first priority class, said second control means sets a length of said second interval depending on the number of unsuccessful attempts to transmit the second random access burst and on the second priority class, and said first interval is shorter than said second interval.

19. An apparatus for transmitting and receiving signals in a wireless telecommunication system, comprising:

transmitting means for transmitting a first random access burst with a first priority class and a second random access burst with a second priority class, first decision means for deciding if first acknowledgement information confirming a successful transmission of said first random access burst has been received, second decision means for deciding if second acknowledgement information confirming a successful transmission of said second random access burst has been received, first control means for randomly choosing a first time point for an attempt to retransmit said first random access burst from a first interval if no acknowledgement information has been received, and second control means for randomly choosing a second time point for an attempt to retransmit said second random access burst from a second interval if no acknowledgement information has been received, wherein said first control means sets a length of said first interval depending on the number of unsuccessful attempts to transmit the first random access burst and on the first priority class, said second control means sets a length of said second interval depending on the number of unsuccessful attempts to transmit the second random access burst and on the second priority class, and the first interval is set shorter than said second interval.

20. An apparatus for transmitting and receiving signals in a wireless telecommunication system, comprising:

transmitting means for transmitting a first random access burst with a first priority class and a second random access burst with a second priority class, first decision means for deciding if first acknowledgement information confirming a successful transmission of the first random access burst, second decision means for deciding if second acknowledgement information confirming a successful transmission of the second random access burst, first control means for setting the length of a first interval for transmitting said first random access burst based on the first priority class and for varying a length of said first interval which is set for the first priority class in accordance with a number of unsuccessful attempts to transmit the first random access burst, and second control means for setting the length of a second interval for transmitting said second random access burst based on the second priority class and for varying a length of said second interval which is set for the second priority class in accordance with a number of unsuccessful attempts to transmit the second random access burst, wherein said first control means randomly choosing a first time point for an attempt to retransmit a next first random access burst from said first varied length of interval, and said second control means randomly choosing a second time point for an attempt to retransmit a next second random access burst from said second varied length of interval.

21. An apparatus for transmitting and receiving signals in a wireless telecommunication system, comprising:

first transmitting means for transmitting a first random access burst with a first priority class to the base station at a first time point which was randomly chosen from a first time interval, second transmitting means for transmitting a second random access burst with a second priority class to the base station at a second time point which was randomly chosen from a second time interval, first control means for varying the length of said first time interval in accordance with the first priority class and a number of unsuccessful attempts to transmit the first random access burst, and second control means for varying the length of said second time interval in accordance with the second priority class and a number of unsuccessful attempts to transmit the second random access burst, wherein said first control means randomly chooses a third time point for an attempt to retransmit a next first random access burst from said first varied length of interval, and said second control means randomly chooses a fourth time point for an attempt to retransmit a next second random access burst from said second varied length of interval.

22. An apparatus for transmitting and receiving signals in a wireless telecommunication system, comprising:

first transmitting means for transmitting a first random access burst by randomly choosing a first time point from a first predetermined time interval, second transmitting means for transmitting a second random access burst by randomly choosing a second time point from a second predetermined time interval.

first decision means for deciding if said first random access burst is successfully transmitted, second decision means for deciding if said second random access burst is successfully transmitted.

first control means for controlling a length of said first interval by using an equation for deciding the length of said first interval, wherein said equation for deciding the length of said first interval includes a parameter indicating the first priority class and a second parameter which is varied on the basis of a number of unsuccessful attempts to transmit the first random access burst, and second control means for controlling a length of said second interval by using an equation for deciding the length of said second interval, wherein said equation for deciding the length of said second interval includes a third parameter indicating the second priority class and a fourth parameter which is varied on the basis of a number of unsuccessful attempts to transmit the second random access burst, wherein said first control means randomly chooses a third time point for an attempt to retransmit a first next random access burst from said first varied length of intervals, and said second control means randomly chooses a fourth time point for an attempt to retransmit a second next random access burst from said second varied length of interval.

23. An apparatus for transmitting and receiving signals in a wireless telecommunication system, comprising:

first transmitting means for transmitting a first random access burst by randomly choosing a first time point from a first predetermined time interval, second transmitting means for transmitting a second random access burst by randomly choosing a second time point from a second predetermined time interval, first control means for setting a length of said first interval based on the first priority class and for varying the length of said first interval corresponding to the first priority class by using an exponential parameter indicating a number of unsuccessful attempts to transmit the first random access burst, and second control means for setting a length of said second interval based on the second priority class and for varying the length of said second interval corresponding to the second priority class by using an exponential parameter indicating a number of unsuccessful attempts to transmit the second random access burst, wherein said first control means randomly choosing a first time point for an attempt to retransmit a next first random access burst from said first varied length of interval, and said second control means randomly choosing a second time point for an attempt to retransmit a next second random access burst from said second varied length of interval.

24. An apparatus for transmitting and receiving signals in a wireless telecommunication system, comprising:

first transmitting means for transmitting a first random access burst by randomly choosing a first time point from a first predetermined time interval, second transmitting means for transmitting a second random access burst by randomly choosing a second time point from a second predetermined time interval, first control means for setting a length of said first interval based on the first priority class and for varying the length of said first time interval based on the first priority class and a number of unsuccessful attempts to transmit the first random access burst so that the varied time window is exponentially increased as a function of both the first priority class and said number of unsuccessful attempts to transmit the first random access burst, and second control means for setting a length of said second interval based on the second priority class and for varying the length of said second time interval based on the second priority class and a number of unsuccessful attempts to transmit the second random access burst so that the varied time window is exponentially increased as a function of both the second priority class and said number of unsuccessful attempts to transmit the second random access burst.

wherein said first control means randomly chooses a first time point for an attempt to retransmit a next first random access burst from said first varied length of intervals, and said second control means randomly chooses a second time point for an attempt to retransmit a next second random access burst from said second varied length of interval.

25. The method for transmitting random access bursts in an apparatus for transmitting and receiving signals in a wireless telecommunication system according to claim 1, wherein said first interval length is set based on the following equation:

$$IL = MW + S \times B^{PO+NF},$$

wherein IL is the first interval length, MW is a minimum length of the first interval length, S is a scaling factor, B is a base factor, PO is a power offset factor, and NF is the number of unsuccessful attempts to transmit the first random access burst.

* * * * *